(12) United States Patent
Shaw et al.

(10) Patent No.: US 10,681,433 B2
(45) Date of Patent: *Jun. 9, 2020

(54) SELECTIVE COMMUNICATION OF A VECTOR GRAPHICS FORMAT VERSION OF A VIDEO CONTENT ITEM

(71) Applicant: AT&T INTELLECTUAL PROPERTY I, LP., Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,939

(22) Filed: Apr. 19, 2019

(65) Prior Publication Data

US 2019/0253772 A1  Aug. 15, 2019

Related U.S. Application Data

(63) Continuation of application No. 14/845,850, filed on Sep. 4, 2015, now Pat. No. 10,313,765.

(51) Int. Cl.
*H04N 21/2662* (2011.01)
*H04N 21/854* (2011.01)
(Continued)

(52) U.S. Cl.
CPC ... *H04N 21/85406* (2013.01); *H04N 21/2393* (2013.01); *H04N 21/23805* (2013.01);
(Continued)

(58) Field of Classification Search
CPC ....... H04N 21/85406; H04N 21/23805; H04N 21/2393; H04N 21/25841;
(Continued)

(56) References Cited

U.S. PATENT DOCUMENTS 6,864,903 B2  3/2005  Suzuki
7,451,467 B2  11/2008  Carver et al.
(Continued)

OTHER PUBLICATIONS

Shapton, D., "There will probably be no 8K. In fact, there will probably be no pixels at all in the future", Dec. 2003, Retrieved from http://www.redsharknews.com/technology/item/1282-there-will-probably-be-no-8k-therewill-probably-be-no-pixels-at-al, 11 pages.
(Continued)

*Primary Examiner* — Nathan J Flynn
*Assistant Examiner* — Caroline Somera
(74) *Attorney, Agent, or Firm* — Guntin & Gust, PLC; John G. Rauch (57) ABSTRACT

A method includes receiving, at a media server from an electronic device, a first request for a video content item. The method includes selecting, at the media server, a particular version of the video content item to communicate to the electronic device based on a geographic location of the electronic device. The particular version is a vector graphics format version responsive to the geographic location corresponding to a first coverage area. The particular version is a bitmap graphics format version responsive to the geographic location corresponding to a second coverage area different from the first coverage area. The method also includes communicating the particular version of the video content item from the media server to the electronic device.

20 Claims, 5 Drawing Sheets

(51) Int. Cl.
*H04N 21/414* (2011.01)
*H04N 21/61* (2011.01)
*H04N 21/238* (2011.01)
*H04N 21/239* (2011.01)
*H04N 21/258* (2011.01)
*H04N 21/262* (2011.01)
*H04N 21/426* (2011.01)
*H04N 21/658* (2011.01)
*H04N 21/81* (2011.01)
*H04B 1/00* (2006.01)
*H04B 7/00* (2006.01)

(52) U.S. Cl.
CPC ... *H04N 21/25841* (2013.01); *H04N 21/2662* (2013.01); *H04N 21/26216* (2013.01); *H04N 21/41407* (2013.01); *H04N 21/42653* (2013.01); *H04N 21/6131* (2013.01); *H04N 21/6181* (2013.01); *H04N 21/6581* (2013.01); *H04N 21/8146* (2013.01)

(58) Field of Classification Search
CPC ......... H04N 21/26216; H04N 21/2662; H04N 21/41407; H04N 21/42653; H04N 21/6131; H04N 21/6181; H04N 21/6581; H04N 21/8146; H04B 1/00; H04B 7/00; G06Q 30/0277
USPC ...................................... 725/62; 455/70, 436
See application file for complete search history.

(56) References Cited

U.S. PATENT DOCUMENTS

| | | |
|---|---|---|
| 8,190,585 B2 | 5/2012 | Salemann |
| 8,204,966 B1 | 6/2012 | Mendis |
| 8,248,458 B2 | 8/2012 | Schowengerdt et al. |
| 8,548,238 B2 | 10/2013 | Tolliver et al. |
| 8,717,463 B2 | 5/2014 | Woods et al. |
| 8,836,860 B2 | 9/2014 | Lee et al. |
| 8,848,091 B2 | 9/2014 | Baraniuk et al. |
| 8,971,402 B2 | 3/2015 | Rodriguez et al. |
| 2002/0131072 A1 | 9/2002 | Jackson |
| 2004/0075670 A1 | 4/2004 | Bezine et al. |
| 2004/0104935 A1 | 6/2004 | Williamson et al. |
| 2005/0073526 A1 | 4/2005 | Nose et al. |
| 2007/0005795 A1 | 1/2007 | Gonzalez |
| 2007/0288841 A1 | 12/2007 | Rohrabaugh et al. |
| 2008/0178249 A1 | 7/2008 | Gordon et al. |
| 2009/0037441 A1 | 2/2009 | Howell |
| 2009/0233705 A1 | 9/2009 | Lemay et al. |
| 2009/0304269 A1 | 12/2009 | Willis |
| 2010/0251294 A1 | 9/2010 | Ooi |
| 2012/0163724 A1 | 6/2012 | Sudan |
| 2012/0213294 A1 | 8/2012 | Hobgood et al. |
| 2013/0021375 A1 | 1/2013 | Deguzman |
| 2013/0166777 A1 | 6/2013 | Chen et al. |
| 2013/0198405 A1 | 8/2013 | Karlsson et al. |
| 2013/0291042 A1 | 10/2013 | O'Hanlon |
| 2013/0329018 A1 | 12/2013 | Gordon et al. |
| 2013/0343461 A1 | 12/2013 | Lee et al. |
| 2014/0019595 A1 | 1/2014 | Lai et al. |
| 2014/0040498 A1 | 2/2014 | Oyman et al. |
| 2014/0089993 A1 | 3/2014 | Huysegems et al. |
| 2014/0150042 A1 | 5/2014 | Pacor |
| 2014/0250059 A1 | 9/2014 | Gilra |
| 2014/0348241 A1 | 11/2014 | Lim et al. |
| 2015/0012928 A1 | 1/2015 | Chen et al. |
| 2015/0020135 A1 | 1/2015 | Frusina et al. |
| 2015/0095766 A1 | 4/2015 | Patrawala et al. |
| 2015/0119139 A1 | 4/2015 | Ladell et al. |
| 2015/0127778 A1 | 5/2015 | De Vleeschauwer et al. |
| 2015/0128090 A1 | 5/2015 | Jennifer |
| 2015/0154633 A1* | 6/2015 | Crow ................ G06Q 30/0251 705/14.49 |
| 2015/0213683 A1 | 7/2015 | Graham et al. |

OTHER PUBLICATIONS

Patterson, J., et al., "Constructing and rendering vectorised photographic images", Journal of Virtual Reality and Broadcasting, vol. 9, 2012, No. 3, 19 pages.

Voxelogram Technology, Voxelogram, Inc., voxelogram.com, 2012, Retrieved from http://voxelogram.com/en/technology/, 2 pages.

Kowaliski, C., et al., "Euclideon preps voxel rendering tech for use in games", The Tech Report, techreport.com, Sep. 24, 2014, Retrieved from http://techreport.com/review/27103/euclideon-preps-voxel-rendering-tech-for-use-in-games, 4 pages.

Coxworth, B., "Vector-based video could mean no more pixels", Gizmag, gizmag.com, Dec. 17, 2012, http://www.gizmag.com/vector-video-codec/25481/, 6 pages.

Lamboray, C. et al., "Dynamic Point Cloud Compression for Free Viewpoint Video", ETH, Department of Computer Science, Institute of Computational Science, Computer Graphics Lab, Mitsubishi Electric Research Laboratories, Dec. 2003, 9 pages.

* cited by examiner

SELECTIVE COMMUNICATION OF A VECTOR GRAPHICS FORMAT VERSION OF A VIDEO CONTENT ITEM

PRIORITY CLAIM

This application claims priority from, and is a continuation of, U.S. patent application Ser. No. 14/845,850, filed on Sep. 4, 2015, which is incorporated herein by reference in its entirety.

FIELD OF THE DISCLOSURE

The present disclosure is generally related to selective communication of a vector graphics format version of a video content item.

BACKGROUND

Video distribution systems or content delivery systems are configured to deliver video content comprised of bitmaps. Bitmaps identify colors of pixels in a particular video frame of the video content. In the context of a wireless communications network, bitmap video content delivery and distribution may be resource intensive, costly, and difficult to manage for a core network, a radio network, operations and maintenance, and customer care.

DETAILED DESCRIPTION

The present disclosure describes systems and methods of selective communication of a vector graphics format version of a video content item or a bitmap graphics format version of the video content item. In contrast to bitmap graphics content which includes an array of pixels, vector graphics includes lines, curves and shapes that are based on geometric formulas. In the present disclosure, the term "vector video" refers to a video that is vector-based (or voxel-based in the case of three-dimensional video) and that can be described by lines, curves and shapes that are based on geometrical formulas. In some cases, delivery of video content items in a vector graphics format instead of a bitmap graphics format may reduce network bandwidth consumption. Further, in some cases, the ability to deliver a higher quality bitmap graphics format version of a video content item may enable a network operator to charge a premium to users that would prefer to receive a higher quality version of a particular video content item.

In a particular embodiment, a method includes receiving a first request for a video content item. The first request is received at a media server from a first electronic device. The method includes selectively communicating a vector graphics format version of the video content item or a bitmap graphics format version of the video content item to the first electronic device.

In another embodiment, an apparatus includes a processor and a memory accessible to the processor. The memory stores instructions that are executable by the processor to perform various operations. The operations include receiving a request for a video content item from an electronic device. The operations also include selectively communicating a vector graphics format version of the video content item or a bitmap graphics format version of the video content item to the electronic device.

In yet another embodiment, an apparatus includes a first decoder and a second decoder. The first decoder is configured to decode bitmap video data, and the second decoder is configured to decode vector video data. The apparatus further includes a processor and a memory that is accessible to the processor. The processor is communicatively coupled to the first decoder and to the second decoder. The memory includes instructions that are executable by the processor to perform various operations. The operations include determining whether a video content item is encoded in a vector video graphics format or a bitmap video graphics format. The operations include directing the video content item to the first decoder in response to determining that the video content item is encoded in the bitmap video graphics format and directing the video content item to the second decoder in response to determining that the video content item is encoded in the vector video graphics format.

Figure 1:
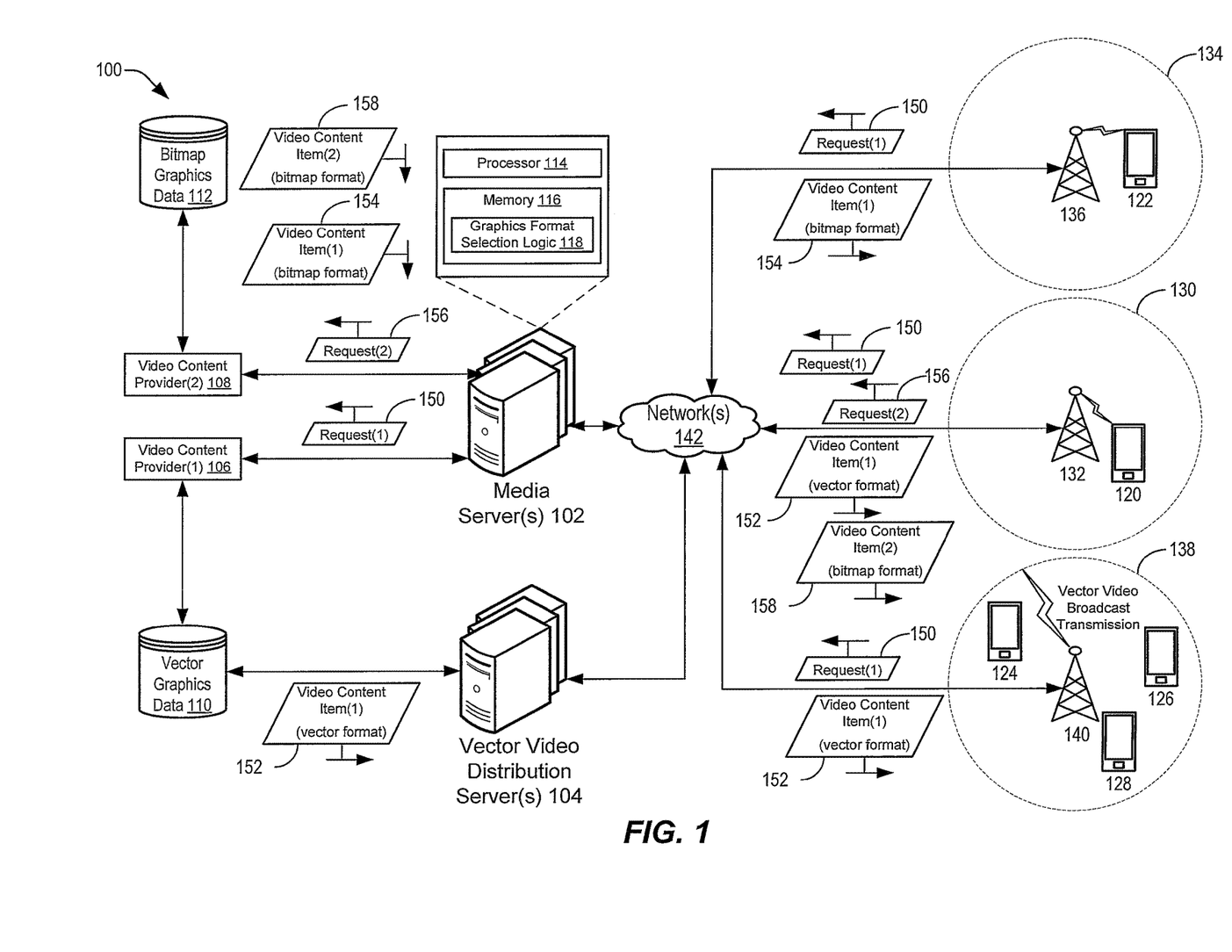
FIG. 1 is a block diagram of an embodiment of a system for selectively communicating a vector graphics format version of a video content item or a bitmap graphics format version of the video content item.

Referring to FIG. 1, a particular embodiment of a system of selectively communicating a vector graphics format version of a video content item or a bitmap graphics format version of the video content item is illustrated and is generally designated 100. FIG. 1 illustrates that, in some cases, a vector graphics format version of the video content item may be communicated to an electronic device (or multiple electronic devices). In other cases, a bitmap graphics format version of the video content item may be communicated to an electronic device (or multiple electronic devices). Selective delivery of vector/bitmap graphics format versions of video content items may enable reduced network bandwidth consumption (in some cases) and/or the ability of a network operator to provide a higher quality bitmap graphics format as a "premium" service (e.g., to a premium content subscriber and/or for an additional fee).

In the particular embodiment illustrated in FIG. 1, the system 100 includes a media server 102 (or multiple media servers) and a vector video distribution server 104 (or multiple vector video distribution servers). The media server 102 may be configured to receive request(s) for a particular video content item from one or more electronic devices (e.g., media playback devices, such as smartphones, tablet computing devices, etc.). As described further herein, the media server 102 may be configured to selectively communicate a vector graphics format version of the video content item or a bitmap graphics format version of the video content item to the requesting electronic device(s).

The vector graphics format version of the video content item may be procedurally generated based on mathematical formulas or representations of objects or images contained in the video content item. In contrast, the bitmap graphics format version of the video content item includes color data associated with each pixel of each image frame of the video content item. By using the mathematical formulas, file size of the vector graphics format version may be lower or reduced compared to the bitmap graphics format version. In another example, the vector graphics format version may be scalable such that the video content item may be scaled or zoomed without substantially degrading quality of the video content item.

When the vector graphics format version of the particular video content item is selected for communication to the requesting electronic device(s), the vector video distribution server 104 may be configured to send the vector graphics format version of the particular video content item to the requesting device(s). When the bitmap graphics format version of the particular video content item is selected, the media server 102 (or another server associated with a video content provider) may be configured to send the bitmap graphics format version of the particular video content item to the requesting device(s).

In the example of FIG. 1, the system 100 includes a first video content provider 106 and a second video content provider 108. The first video content provider 106 may correspond to a vector video content provider, and the second video content provider 108 may correspond to a bitmap video content provider. FIG. 1 illustrates that vector graphics data 110 (including a plurality of video content items in the vector graphics format) may be accessible to the first video content provider 106. FIG. 1 further illustrates that bitmap graphics data 112 (including a plurality of video content items in the bitmap graphics format) may be accessible to the second video content provider 108. FIG. 1 depicts the media server 102, the video content providers 106-108, and the vector/bitmap graphics data 110-112 as being separate, for illustrative purposes only. To illustrate, in some embodiments, the media server 102 may be configured to receive a bitmap graphics format version of a video content item (e.g., from a video content provider, such as an over-the-top (OTT) video service provider) and to convert the bitmap graphics format version of the video content item into a vector graphics format version of the video content item.

In the particular embodiment illustrated in FIG. 1, the media server 102 includes a processor 114 and a memory 116 that is accessible to the processor 114. The memory 116 stores instructions that are executable by the processor 114 to perform various operations. In the example of FIG. 1, the memory 116 includes graphics format selection logic 118. The media server 102 may be configured to utilize the graphics format selection logic 118 to select a vector graphics format version of a video content item to be communicated to the requesting device(s) or a bitmap graphics format version of the video content item to be communicated to the requesting device(s).

In the example of FIG. 1, the system 100 includes multiple electronic devices (e.g., media playback devices) that are configured to generate requests for video content items. In the particular embodiment illustrated in FIG. 1, the electronic devices include a first electronic device 120, a second electronic device 122, a third electronic device 124, a fourth electronic device 126, and a fifth electronic device 128. It will be appreciated that the example electronic devices of FIG. 1 are for illustrative purposes only and that the system 100 may include alternative numbers and/or types of electronic devices. In FIG. 1, the first electronic device 120 is illustrated as being within a first wireless coverage area 130 associated with a first network component 132 (e.g., a first wireless access device, such as a cellular tower or an access point) of a wireless communications network. The second electronic device 122 is illustrated as being within a second wireless coverage area 134 associated with a second network component 136 (e.g., a second wireless access device, such as a cellular tower or an access point) of the wireless communications network. The third electronic device 124, the fourth electronic device 126, and the fifth electronic device 128 are illustrated as being within a third wireless coverage area 138 associated with a third network component 140 (e.g., a third wireless access device, such as a cellular tower or an access point) of the wireless communications network. As described further herein, the media server 102 may be configured to communicate one or more vector video content items to the third network component 140 for communication to the representative electronic devices 124-128 within the third wireless coverage area 138 via a vector video broadcast transmission.

In operation, the first electronic device 120 may generate a first request 150 for a first video content item (identified as "Video Content Item(1)" in FIG. 1). The first electronic device 120 may send the first request 150 to the media server 102 (e.g., via the first network component 132 and the network 142). In response to receiving the first request 150, the media server 102 may utilize the graphics format selection logic 118 to select a vector graphics format version 152 of the first video content item or a bitmap graphics format version 154 of the first video content item for communication to the first electronic device 120.

FIG. 1 illustrates that, when the vector graphics format version 152 of the first video content item is selected, the media server 102 may send information associated with the first request 150 to the first video content provider 106. The first video content provider 106 may retrieve, based on the information associated with the first request 150, the vector graphics format version 152 of the first video content item from the vector graphics data 110. In the example of FIG. 1, the first video content provider 106 may send the vector graphics format version 152 of the first video content item to the vector video distribution server 104 for communication to the first electronic device 120. In alternative embodiments, the media server 102 may include graphics format conversion logic (not shown in FIG. 1) to convert the bitmap graphics format version 154 of the first video content item (e.g., from the second video content provider 108) into the vector graphics format version 152 of the first video content item.

In some cases, the vector video distribution server 104 may include a plurality of vector video distribution servers, and the first video content provider 106 may select a particular vector video distribution server of the plurality of vector video distribution servers for communication of the vector graphics format version 152 of the first video content item to the first electronic device 120.

FIG. 1 further illustrates that, when the bitmap graphics format version 154 of the first video content item is selected, the media server 102 may send information associated with the first request 150 to the second video content provider 108. The second video content provider 108 may retrieve, based on the information associated with the first request 150, the bitmap graphics format version 154 of the first video content item from the bitmap graphics data 112. In the example of FIG. 1, the second video content provider 108 may send the bitmap graphics format version 154 of the first video content item to the media server 102 for communication to the first electronic device 120. While not shown in the example of FIG. 1, in alternative embodiments, the second video content provider 108 may send the bitmap graphics format version 154 of the first video content item to another server for communication to the first electronic device 120.

FIG. 1 illustrates an example in which the graphics format selection logic 118 selects the vector graphics format version 152 of the first video content item for communication to the first electronic device 120 responsive to the first request 150 (based on one or more factors, as further described herein). By contrast, as described further herein, the graphics format selection logic 118 may select the bitmap graphics format version 154 for communication to the second electronic device 122 responsive to a request for the same video content item (based on one or more factors, as further described herein).

In a particular embodiment, the graphics format selection logic 118 may determine a video content type associated with the first video content item that is requested by the first electronic device 120. The graphics format selection logic 118 may select the vector graphics format version 152 of the first video content item to be communicated to the first electronic device 120 based on the video content type comprising a first video content type. To illustrate, the first video content type may correspond to cartoon content, animated content, gaming content, or a combination thereof. In a particular embodiment, the cartoon content, animated content, gaming content, or a combination thereof, may include computer-generated images such that a corresponding vector version of the computer-generated images may be available or generated based on the polygons, curves, lines, or gradients included in the first video content type. By contrast, in some cases, the graphics format selection logic 118 may select the bitmap graphics format version 154 of the first video content item based on the video content type comprising a second video content type.

As another example, the graphics format selection logic 118 may select the vector graphics format version 152 of the first video content item to be communicated to the first electronic device 120 during a first time period. The graphics format selection logic 118 may select the bitmap graphics format version 154 of the first video content item to be communicated to the first electronic device 120 during a second time period. FIG. 1 illustrates an example in which the first request 150 is communicated from the first electronic device 120 to the media server 102 via a wireless communications network. In this case, the first time period may represent a busy/peak time period (e.g., early evening) during which first network bandwidth usage of the wireless communications network may be greater than second network bandwidth usage of the wireless communications network during an off-peak time period (e.g., before/after the early evening busy/peak time period). Thus, selecting the vector graphics format version 152 during a busy/peak time period may enable reduced network bandwidth usage, increased throughput of the first video content item, improved management of content requests from multiple devices, or any combination thereof.

As another example, determining bandwidth usage and the busy/peak time period may be based on historical data and/or empirical measurements in real-time or near real-time. Determining the bandwidth usage may also be performed by a requesting electronic device (e.g., the first electronic device 120, the second electronic device 122, the third electronic device 124, the fourth electronic device 126, or the fifth electronic device 128), the media server 102, the vector video distribution server 104, or any combination thereof. For example, historical data may be based on aggregating previous busy/peak time periods and analyzing the previous busy/peak time periods for correlation with respect to the time of day. The historical data may also be based on previous attempts to retrieve the first video content item at particular times which may have resulted in selection of the vector graphics format version 152. As an illustrative example, prior to the first electronic device 120 sending the first request 150, the first electronic device 120 may perform measurements with respect to the network 142 to determine whether to request the vector graphics format version 152 of the first video content item or the bitmap graphics format version 154 of the first video content item. Alternatively, the media server 102, the vector video distribution server 104, or both, may perform measurements with respect to the network 142 after receiving the first request 150.

As yet another example, the graphics format selection logic 118 may select the vector graphics format version 152 of the first video content item to be communicated to the first electronic device 120 based on a first geographic location of the first electronic device 120 (e.g., within the wireless coverage area 130 associated with the first network component 132). The graphics format selection logic 118 may select the bitmap graphics format version 154 of the first video content item to be communicated to the first electronic device 120 based on a second geographic location of the first electronic device 120 (e.g., when the first electronic device 120 moves to the second wireless coverage area 134 associated with the second network component 136). For example, the vector graphics format version 152 may be selected when the first electronic device 120 is located at a densely populated area such as a stadium or a convention center.

Figure 2:
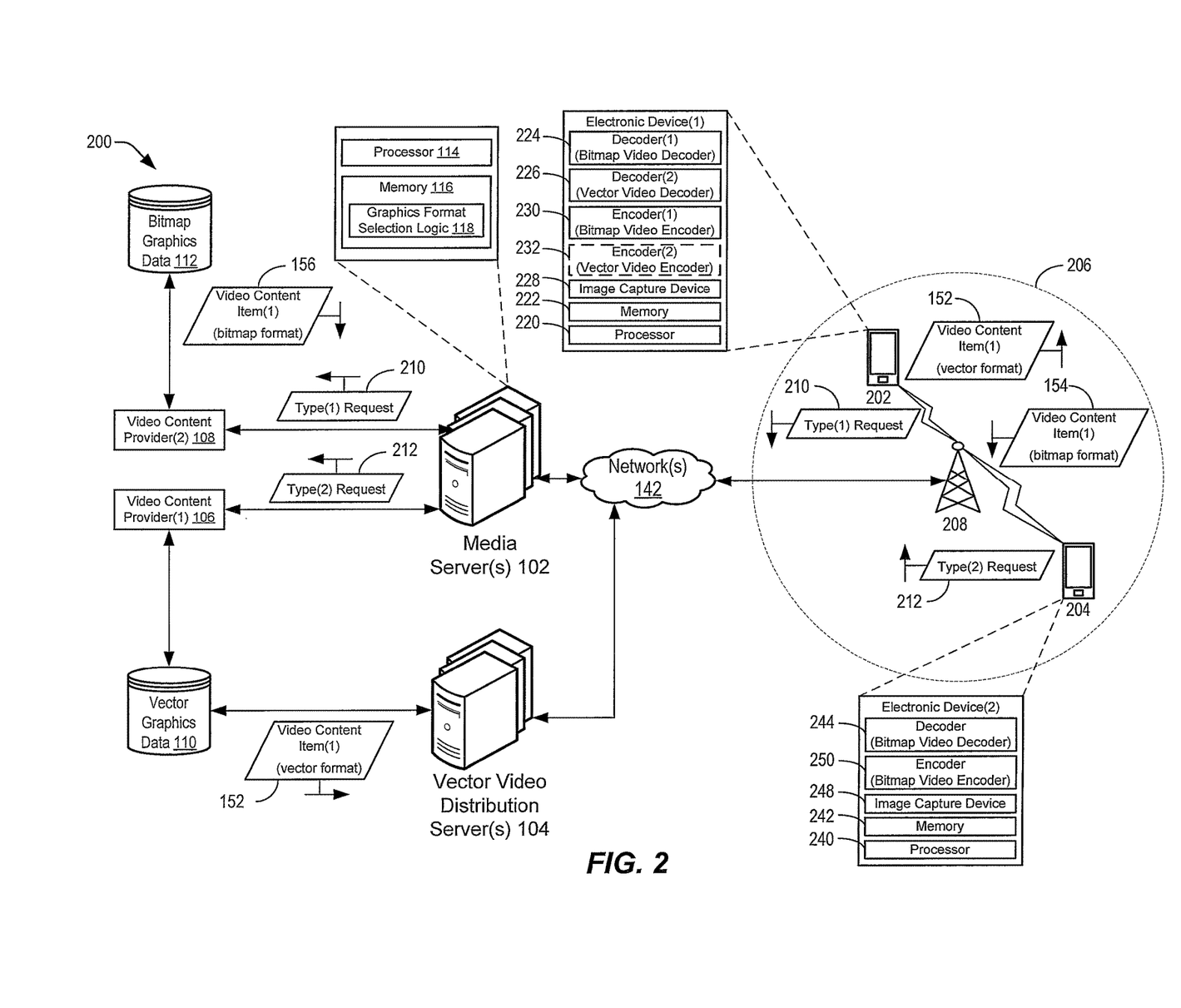
FIG. 2 is a block diagram of an embodiment of a system for selectively encoding/decoding a vector/bitmap graphics format version of a video content item.

As described further herein with respect to FIG. 2, in some cases, the media server 102 may determine, based on information received from the first electronic device 120, whether the first electronic device 120 includes a vector video decoder. In this example, when the first electronic device 120 includes the vector video decoder, the graphics format selection logic 118 may select the vector graphics format version 152 of the first video content item to be communicated to the first electronic device 120 based on the determination that the first electronic device 120 includes the vector video decoder. The graphics format selection logic 118 may select the bitmap graphics format version 154 of the first video content item based on a determination that the first electronic device 120 does not include the vector video decoder or is otherwise unable to play the vector graphics format version 152 of the first video content item.

In a particular embodiment, the media server 102 may determine whether a network bandwidth usage of a wireless communications network for communication of the first video content item to the first electronic device 120 satisfies a threshold. The graphics format selection logic 118 may select the vector graphics format version 152 of the first video content item based on the network bandwidth usage satisfying the threshold. To illustrate, the first coverage area 130 may be associated with a mall, a stadium, etc. that may experience network congestion either regularly or during sporting events, among other examples. In this case, selection of the vector graphics format version 152 of the first video content item may conserve network bandwidth (compared to the bitmap graphics format version 154) because the vector graphics format version 152 of the first video content item may have a smaller file size than the bitmap graphics format version 154.

FIG. 1 further illustrates that the other electronic devices 122-128 may also generate requests for the first video content item. For ease of illustration, the requests from the other electronic devices 122-128 are identified by the reference number 150 to indicate that the video content item associated with the first request 150 from the first electronic device 120 is the same video content item that is requested by the other electronic devices 122-128. However, it will be appreciated that individual requests for the same video content item ("Video Content Item(1)" in this example) from each of the electronic devices 120-128 may include alternative and/or additional information (e.g., a device identifier of the requesting device, location information of the requesting device, etc.).

FIG. 1 illustrates that the second electronic device 122 may generate the first request 150 for the first video content item. The second electronic device 122 may send the first request 150 to the media server 102 (e.g., via the second network component 136 and the network 142). In response to receiving the first request 150 from the second electronic device 122, the media server 102 may utilize the graphics format selection logic 118 to select (based on one or more factors, such as bandwidth availability, device location, device capabilities, etc.) the vector graphics format version 152 of the first video content item or the bitmap graphics format version 154 of the first video content item for communication to the second electronic device 122. In the particular embodiment illustrated in FIG. 1, the graphics format selection logic 118 determines that the bitmap graphics format version 154 of the first video content item is to be communicated to the second electronic device 122.

As an example, the graphics format selection logic 118 may select the vector graphics format version 152 of the first video content item for communication to the second electronic device 122 during a busy/peak time period when a network bandwidth usage may be greater than the network bandwidth usage during an off-peak time period. As another example, the graphics format selection logic 118 may select the vector graphics format version 152 of the first video content item based on the second electronic device 122 being located at a particular geographic location. To illustrate, the second wireless coverage area 134 may represent a "congested" location, such as a mall or a stadium (among other alternatives). As a further example, the media server 102 may determine, based on information received from the second electronic device 122, that the second electronic device 122 does not include a vector video decoder. In this case, the graphics format selection logic 118 may select the bitmap graphics format version 154 of the first video content item for communication to the second electronic device 122.

FIG. 1 further illustrates that the third, fourth, and fifth electronic devices 124-128 within the third wireless coverage area 138 may generate the first request 150 for the first video content item. In the particular embodiment illustrated in FIG. 1, the third network component 140 may transmit the vector graphics format version 152 of the first video content item as a vector video broadcast transmission.

In a particular embodiment, user input may be used to select a particular graphics format version of a requested video content item. In the particular embodiment illustrated in FIG. 1, the first electronic device 120 may generate a second request 156 for a second video content item (identified as "Video Content Item(2)" in FIG. 1). In some cases, the second request 156 may indicate that a user has accepted an additional fee associated with delivery of a higher quality bitmap version of a video content item. The first electronic device 120 may send the second request 156 to the media server 102. In the example of FIG. 1, the media server 102 selects a bitmap graphics format version 158 of the second video content item for communication to the first electronic device 120.

The media server 102 may send information (e.g., a video content item identifier) associated with the second request 156 to the second video content provider 108. The second video content provider 108 may retrieve, based on the information associated with the second request 156, the bitmap graphics format version 158 of the second video content item from the bitmap graphics data 112. In the example of FIG. 1, the second video content provider 108 may send the bitmap graphics format version 158 of the second video content item to the media server 102 for communication to the first electronic device 120.

Thus, FIG. 1 illustrates an example of a system configured to selectively communicate a vector graphics format version of a video content item or a bitmap graphics format version of the video content item based on one or more factors, such as bandwidth availability, device location, device capabilities, etc. Selective delivery of vector/bitmap graphics format versions of video content items may allow for reduced network bandwidth usage (in some cases) and/or the ability of a network operator to provide a higher quality bitmap graphics format as a "premium" service (e.g., to a premium content subscriber and/or for an additional fee).

Referring to FIG. 2, a particular embodiment of a system for encoding/decoding a vector/bitmap graphics format version of a video content item is illustrated and is generally designated 200. FIG. 2 illustrates that selective communication of vector/bitmap graphics data may depend, at least in part, on capabilities of requesting devices. For example, in cases where an electronic device does not include a vector video decoder, the electronic device may be unable to decode a vector graphics format version of a video content item. FIG. 2 further illustrates that an electronic device may include a vector video encoder. In this case, the electronic device may be capable of generating a vector graphics format version of an image captured by an image capture device for communication to another electronic device (e.g., to a server, to a media playback device, or a combination thereof).

In the particular embodiment illustrated in FIG. 2, the system 200 includes a first electronic device 202 and a second electronic device 204. In the example of FIG. 2, the first electronic device 202 and the second electronic device 204 are located within a coverage area 206 associated with a network component 208 (e.g., a wireless access device, such as a cellular tower, of a wireless communications network). FIG. 2 illustrates that the first electronic device 202 may generate a request 210 for graphics content having a first video content type (identified as "Type(1) Request" in FIG. 2). The second electronic device 204 may generate a request 212 for graphics content having a second video content type (identified as "Type(2) Request" in FIG. 2).

In the example illustrated in FIG. 2, the first electronic device 202 includes a processor 220, a memory 222, a first decoder 224, and a second decoder 226. The first decoder 224 is configured to decode bitmap video data, and the second decoder is configured to decode vector video data. The processor 220 is communicatively coupled to the first decoder 224 and to the second decoder 226. The memory is accessible to the processor 222 and stores instructions that are executable by the processor 222 to perform various operations. The operations may include determining whether a video content item is encoded in a vector video graphics format or a bitmap video graphics format. The operations may also include directing the video content item to the first decoder 224 in response to determining that the video content item is encoded in the bitmap video graphics format. The operations may further include directing the video content item to the second decoder 226 in response to determining that the video content item is encoded in the vector video graphics format.

In the particular embodiment illustrated in FIG. 2, the first electronic device 202 further includes an image capture device 228 (e.g., a camera), a first encoder 230, and a second encoder 232. The first encoder 230 may be configured to encode a second video content item captured by the image capture device 228 into the bitmap video graphics format. The second encoder 232 may be configured to encode the second video content item into the vector video graphics format. Thus, in some cases, the first electronic device 202 (e.g., a smartphone, etc.) may be configured to selectively communicate bitmap/vector graphics format versions of video content captured by the image capture device 228 (e.g., for reduced usage of a limited subscriber data plan, for communication to another device that does not have a vector video decoder, etc.).

In the particular embodiment illustrated in FIG. 2, the second electronic device 204 includes a processor 240, a memory 242, and a decoder 244. The decoder 244 is configured to decode bitmap video data. As the second electronic device 204 does not include a vector video decoder, the second electronic device 204 may include information in the request 212 to the media server 102 to indicate that the second electronic device 204 is not capable of decoding a vector graphics format version of a video content item. When the second electronic device 204 receives the bitmap graphics format version 156 of the first video content item, the processor 240 is configured to direct the bitmap graphics format version 156 of the first video content item to the decoder 244. FIG. 2 further illustrates that the second electronic device 204 includes an image capture device 248 and an encoder 250. In contrast to the first electronic device 202, the second electronic device 204 may utilize the encoder 250 to encode data captured by the image capture device 248 into the bitmap graphics format (e.g., for communication to a server, to a media playback device, or a combination thereof).

In another particular embodiment, the first electronic device 202 may be configured to send a bitmap graphics format version of video content to the second electronic device 204 based on a determination that the second electronic device 204 does not include a vector video decoder. For example, determining whether the second electronic device 204 includes a vector video decoder may be performed during a setup period of a video conference call between the first electronic device 202 and the second electronic device 204. If both the first electronic device 202 and the second electronic device 204 include a vector video decoder, then a vector graphics format version of the video content may be used. Alternatively, if one or both of the first electronic device 202 and the second electronic device 204 do not include a vector video decoder, than the bitmap graphics format version of the video content may be used.

Thus, FIG. 2 illustrates an example of a system for encoding/decoding a vector/bitmap graphics format version of a video content item. When an electronic device does not include a vector video decoder, the electronic device may be unable to decode a vector graphics format version of a video content item. In this case, the media server may select a bitmap graphics format version for communication to the electronic device. FIG. 2 further illustrates that an electronic device may include a vector video encoder. In this case, the electronic device may be capable of generating a vector graphics format version of an image captured by an image capture device for communication to another electronic device (e.g., to a server, to a media playback device, or a combination thereof).

Figure 3:
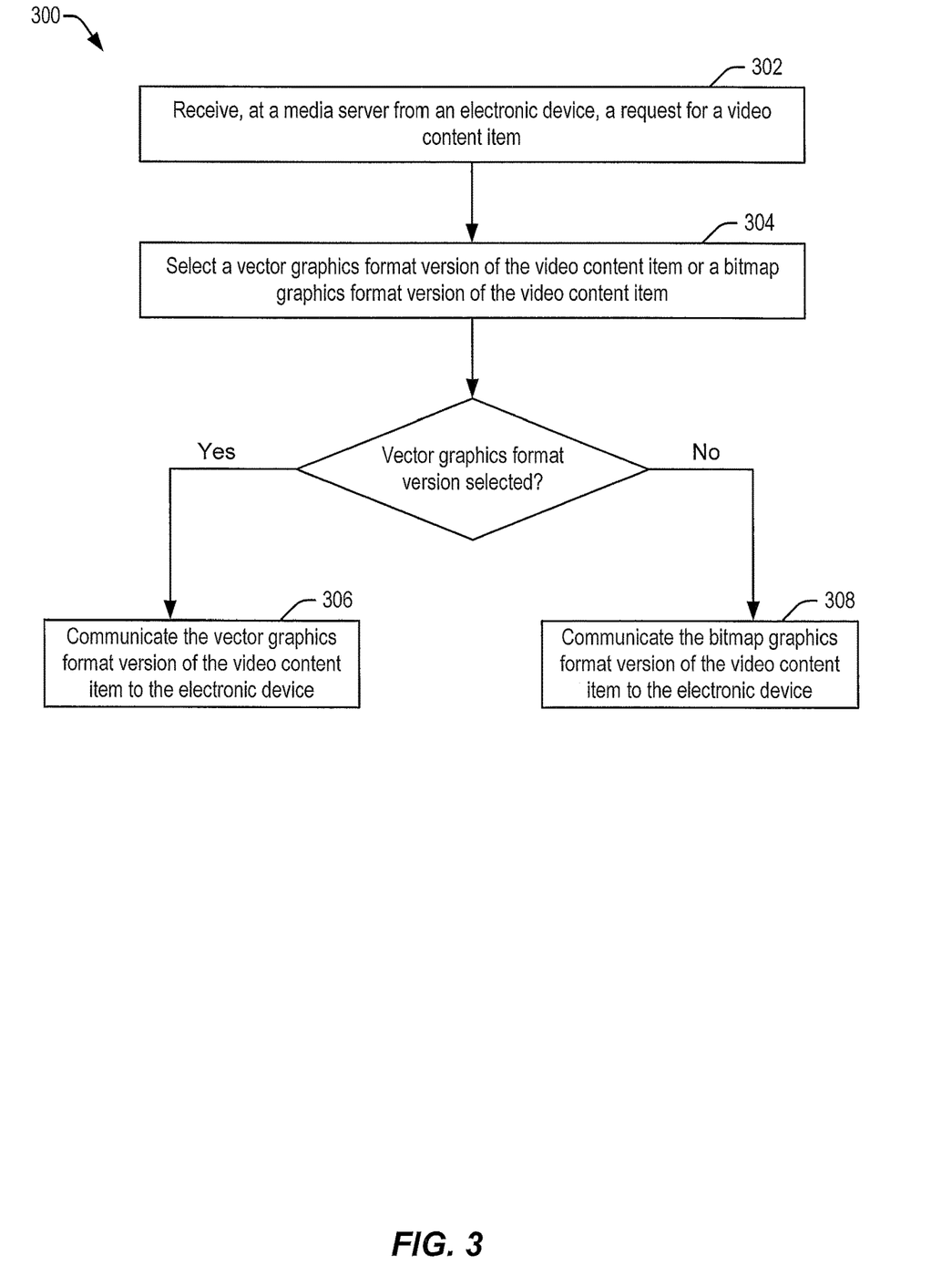
FIG. 3 is a flowchart of an illustrative embodiment of a method of selectively communicating a vector graphics format version of a video content item or a bitmap graphics format version of the video content item.

FIG. 3 illustrates a particular embodiment of a method 300 of selectively communicating a vector graphics format version of a video content item or a bitmap graphics format version of the video content item.

In the particular embodiment illustrated in FIG. 3, the method 300 includes receiving a first request for a video content item, at 302. The first request is received at a media server from a first electronic device. For example, referring to FIG. 1, the media server 102 may receive the first request 150 for the first video content item (identified as "Video Content Item(1)" in FIG. 1) from the first electronic device 120. As another example, the media server 102 may receive the first request 150 for the first video content item from the second electronic device 122. As a further example, the media server 102 may receive the first request 150 from each of the electronic devices 124-128 within the third wireless coverage area 138. As yet another example, referring to FIG. 2, the media server 102 may receive the request 210 from the first electronic device 202. As a further example, referring to FIG. 2, the media server 102 may receive the request 212 from the second electronic device 204.

The method 300 includes selecting a vector graphics format version of the video content item or a bitmap graphics format version of the video content item, at 304. For example, referring to FIG. 1, the graphics format selection logic 118 at the media server 102 may select the vector graphics format version 152 of the first video content item (identified as "Video Content Item(1)" in FIG. 1) or the bitmap graphics format version 154 of the first video content item (for the first request 150). As another example, referring to FIG. 2, the graphics format selection logic 118 at the media server 102 may select the vector graphics format version 152 of the first video content item (identified as "Video Content Item(1)" in FIG. 2) or the bitmap graphics format version 154 of the first video content item.

FIG. 3 illustrates that, when the vector graphics format version is selected, the method 300 includes communicating the vector graphics format version of the video content item to the electronic device, at 306. For example, referring to FIG. 1, the vector graphics format version 152 of the first video content item may be communicated to the first electronic device 120 responsive to the first request 150. As another example, referring to FIG. 1, the vector graphics format version 152 of the first video content item may be communicated to the electronic devices 124-128 (e.g., as a vector video broadcast transmission to devices within the third wireless coverage area 138). As another example, referring to FIG. 2, the vector graphics format version 152 of the first video content item may be communicated to the first electronic device 202.

FIG. 3 illustrates that, when the bitmap graphics format version is selected, the method 300 includes communicating the bitmap graphics format version of the video content item to the electronic device, at 308. For example, referring to FIG. 1, the bitmap graphics format version 154 of the first video content item may be communicated to the second electronic device 122. As another example, referring to FIG. 2, the bitmap graphics format version 154 of the first video content item may be communicated to the second electronic device 204.

Thus, FIG. 3 illustrates an example of a method of selectively communicating a vector graphics format version of a video content item or a bitmap graphics format version of the video content item.

Figure 4:
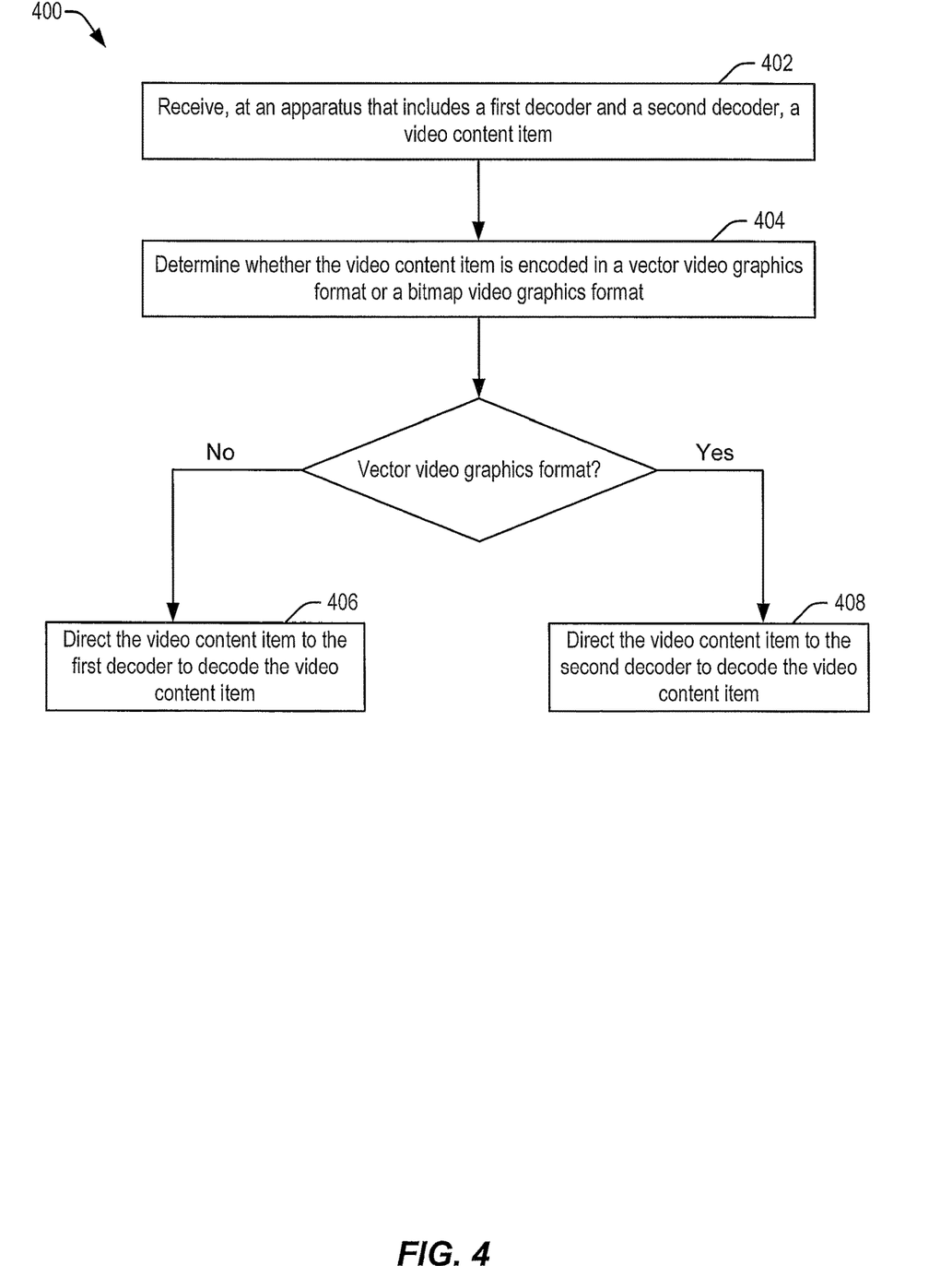
FIG. 4 is a flowchart of an illustrative embodiment of a method of directing a video content item to a particular decoder based on whether the video content item is encoded in a vector video graphics format or a bitmap video graphics format.

FIG. 4 illustrates a particular embodiment of a method 400 of directing a video content item to a particular decoder based on whether the video content item is encoded in a vector video graphics format or a bitmap video graphics format.

In the particular embodiment illustrated in FIG. 4, the method 400 includes receiving, at an apparatus that includes a first decoder and a second decoder, a video content item, at 402. For example, referring to FIG. 2, the first electronic device 202 includes the first decoder 224 (e.g., a bitmap video decoder) and the second decoder 226 (e.g., a vector video decoder).

The method 400 includes determining whether the video content item is encoded in a vector video graphics format or a bitmap video graphics format, at 404. For example, FIG. 2 illustrates the first electronic device 202 receiving the vector graphics format version 152 of the first video content item.

FIG. 4 illustrates that, when the video content item is encoded in the vector graphics format, the method 400 includes directing the video content item to the first decoder to decode the video content item, at 406. For example, referring to FIG. 2, the processor 220 at the first electronic device 202 may direct the vector graphics format version 152 of the first video content item to the second decoder 226 (the vector video decoder).

FIG. 4 illustrates that, when the video content item is not encoded in the vector video graphics format, the method 400 includes directing the video content item to the second decoder to decode the video content item, at 408. For example, while not shown in the example of FIG. 2, when the first electronic device 202 receives a video content item that is encoded in a bitmap graphics format, the processor 220 may direct the video content item to the first decoder 224 (the bitmap video decoder).

Thus, FIG. 4 illustrates an example of a method of directing a video content item to a particular decoder based on whether the video content item is encoded in a vector video graphics format or a bitmap video graphics format.

Figure 5:
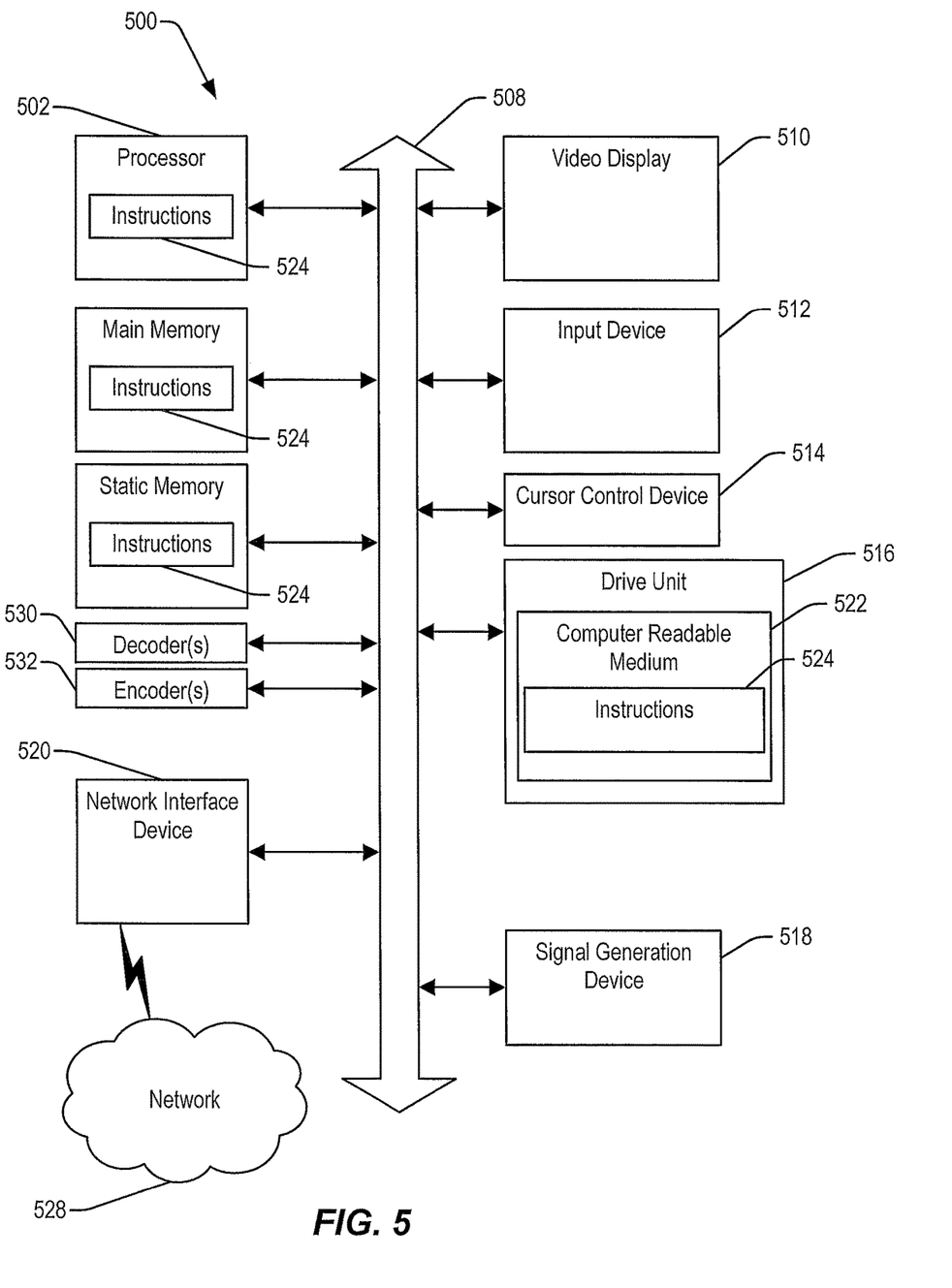
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the media server(s) 102 or vector video distribution server(s) 104 described with reference to FIGS. 1 and 2. As another example, the computer system 500 may include or be included within any one or more of the electronic devices 120-128 and 202-204, described with reference to FIGS. 1 and 2.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, the processor 502 may include or correspond to the processor 114 of the media server 102 illustrated in FIGS. 1 and 2 or a processor of the vector video distribution server 104 illustrated in FIGS. 1 and 2. As another example, the processor 502 may correspond to a processor of the electronic devices 120-128 of FIG. 1 or a processor of the electronic devices 202-204 of FIG. 2. Moreover, the computer system 500 may include a main memory 504 and a static memory 506, which can communicate with each other via a bus 508. For example, the main memory 504 may include or correspond to the memory 116 of the media server 102 of FIGS. 1 and 2 or a memory of the vector video distribution server 104 of FIGS. 1 and 2. As another example, the main memory 504 may correspond to a memory of the electronic devices 220-228 of FIG. 1 or a memory of the electronic devices 202-204 of FIG. 2.

As shown, the computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some embodiments, the input device 512 and the cursor control device 514 may be integrated into a single device, such as a capacitive touch screen input device. The computer system 500 may also include a signal generation device 518, such as a speaker, and a network interface device 520. Some computer systems 500 may not include an input device (e.g., a server may not include an input device).

In a particular embodiment, as depicted in FIG. 5, the device 500 may include computer-readable storage 522 in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein. The instructions 524 may be executable by the processor 502 to perform one or more functions or methods described herein, such as the method 300 described with reference to FIG. 5. In a particular embodiment, the instructions 524 may reside completely, or at least partially, within the main memory 504, the static memory 506, and/or within the processor 502 during execution by the computer system 500. The main memory 504 and the processor 502 also may include a computer-readable storage device.

In a particular embodiment (e.g., when the computing device 500 corresponds to a server, such as the media server 102 of FIGS. 1 and 2), the instructions 524 may be executable by the processor 502 to receive a request for a video content item from an electronic device. The instructions 524 may be further executable by the processor 502 to selectively communicate a vector graphics format version of the video content item or a bitmap graphics format version of the video content item to the electronic device.

FIG. 5 illustrates that, in some cases, the computing device 500 may correspond to an electronic device that includes one or more decoders 530. In some cases, the decoder(s) 530 may include a first encoder that is configured to decode bitmap video data and a second encoder that is configured to decode vector video data. In this example, the instructions 524 may be executable by the processor 502 to determine whether a video content item is encoded in a vector video graphics format or a bitmap video graphics format. In response to determining that the video content item is encoded in the bitmap video graphics format, the video content item may be directed to the first decoder (the bitmap video decoder) of the decoder(s) 530. In response to determining that the video content item is encoder in the vector graphics format, the video content item may be directed to the second decoder (the vector video decoder).

FIG. 5 illustrates that, in some cases, the computing device 500 may correspond to an electronic device (e.g., a server, a smartphone, a tablet computing device, etc.) that includes one or more encoders 532. For example, the encoder(s) 532 may include a first encoder that is configured to encode a video content item into a bitmap graphics format version and a second encoder that is configured to encode the video content item into a vector graphics format version.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to a network 528 may communicate voice, video or data over the network 528. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein.

As an example, when the computer system 500 corresponds to a media server (e.g., the media server 102 of FIGS. 1 and 2), the computer-readable storage device 522 may store instructions for execution by a processor to cause a computer system to perform the method 300 described with reference to FIG. 3.

As another example, when the computer system 500 corresponds to a media playback device (e.g., the electronic devices 120-128 illustrated in FIG. 1 or the electronic devices 202-204 illustrated in FIG. 2), the computer-readable storage device 522 may store instructions for execution by a processor to cause a computer system to perform the method 400 described with reference to FIG. 4.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a media server from an electronic device, a request for a video content item; and
   selecting, at the media server, a particular version of the video content item to communicate to the electronic device based on a geographic location of the electronic device, wherein the particular version is a vector graphics format version responsive to the geographic location corresponding to a first coverage area, and wherein the particular version is a bitmap graphics format version responsive to the geographic location corresponding to a second coverage area different from the first coverage area; and
   communicating the particular version of the video content item from the media server to the electronic device in response to the request.

2. The method of claim 1, further comprising changing the particular version from the vector graphics format version to the bitmap graphics format version responsive to the geographic location of the electronic device changing from a first location in the first coverage area to a second location in the second coverage area.

3. The method of claim 1, further comprising changing the particular version from the bitmap graphics format version to the vector graphics format version responsive to the geographic location of the electronic device changing from a first location in the second coverage area to being a second location in the first coverage area.

4. The method of claim 1, further comprising changing the particular version from the bitmap graphics format version to the vector graphics format version based on a time of day of the request corresponding to a busy time period of bandwidth usage of a wireless network in use of the electronic device.

5. The method of claim 4, further comprising determining the busy time period based on historical data.

6. The method of claim 4, further comprising determining the busy time period based on measurements of usage of the wireless network.

7. The method of claim 1, further comprising determining that the electronic device is capable of receiving the bitmap graphics format version before the selecting the particular version.

8. The method of claim 1, further comprising determining that the video content item does not correspond to cartoon content, animated content, gaming content, or a combination thereof, before the selecting the particular version.

9. The method of claim 1, wherein the first coverage area corresponds to a densely populated area.

10. The method of claim 9, wherein the first coverage area is densely populated due to an event.

11. An apparatus comprising:
    a processor; and
    a memory accessible to the processor, the memory storing instructions executable by the processor to perform operations, the operations including:
    receiving a request for a video content item from an electronic device; selecting a particular version of the video content item to communicate to the electronic device based on a geographic location of the electronic device, wherein the particular version is a vector graphics format version responsive to the geographic location corresponding to a first coverage area, and wherein the particular version is a bitmap graphics format version responsive to the geographic location corresponding to a second coverage area different from the first coverage area; and
    communicating the particular version of the video content item to the electronic device.

12. The apparatus of claim 11, wherein the operations further include determining that the electronic device is capable of receiving the bitmap graphics format version before the selecting the particular version.

13. The apparatus of claim 11, wherein the operations further include determining that the video content item does not correspond to cartoon content, animated content, gaming content, or a combination thereof, before the selecting the particular version.

14. The apparatus of claim 11, wherein the operations further include changing the particular version from the bitmap graphics format version to the vector graphics format version based on a time of day of the request corresponding to a busy time period of bandwidth usage of a wireless network in use of the electronic device.

15. The apparatus of claim 11, wherein the operations further include converting the bitmap graphics format version into the vector graphics format version.

16. A computer-readable storage device storing instructions executable by a processor to perform operations, the operations comprising:
  receiving a request for a video content item from an electronic device;
  determining a category of content of the video content item;
  selecting a particular version of the video content item to communicate to the electronic device based on the category of content, wherein the particular version is a vector graphics format version of the video content item responsive to the category of content being a first category, the first category corresponding to cartoon content, animated content, gaming content, or a combination thereof, and wherein the particular version is a bitmap graphics format version responsive to the category of content being a second category different than the first category; and
  communicating the particular version of the video content item to the electronic device.

17. The computer-readable storage device of claim 16, wherein the operations further comprise changing the particular version from the bitmap graphics format version to the vector graphics format version responsive to a determination that a location of the electronic device is in a first coverage area, the first coverage area corresponding to a densely populated area.

18. The computer-readable storage device of claim 17, wherein the operations further comprise changing the particular version from the vector graphics format version to the bitmap graphics format version responsive to a determination that the electronic device has left the first coverage area.

19. The computer-readable storage device of claim 16, wherein the operations further comprise changing the particular version from the bitmap graphics format version to the vector graphics format version responsive to a determination that a time of day of receipt of the request corresponds to a busy time of bandwidth usage of a wireless network in use by the electronic device.

20. The computer-readable storage device of claim 16, wherein the operations further comprise determining that the electronic device is capable of processing the vector graphics format version and the bitmap graphics format version before the selecting the particular version.

* * * * *